United States Patent [19]

Gussin et al.

[11] Patent Number: 4,718,028
[45] Date of Patent: Jan. 5, 1988

[54] EXTREMELY HIGH SPEED, REAL-TIME BACKGROUND FILTER FOR RADIATION DETECTORS

[75] Inventors: Edward L. Gussin, Agoura; Richard E. Burney, Anaheim; J. Brian Murphy, Marina Del Rey; Carl G. Pfeiffer, Hermosa Beach; Richard L. Hedden, Los Angeles, all of Calif.

[73] Assignee: Hughes Aircraft Company, Los Angeles, Calif.

[21] Appl. No.: 830,392

[22] Filed: Feb. 18, 1986

[51] Int. Cl.⁴ .............................................. H03H 9/46
[52] U.S. Cl. .................................... 364/572; 342/159; 364/516
[58] Field of Search .............................. 364/572–575, 364/578, 579, 423, 424, 456, 516, 517, 414; 328/162–167; 342/90, 101, 159–163, 195, 203

[56] References Cited

U.S. PATENT DOCUMENTS

| | | | |
|---|---|---|---|
| 4,064,511 | 12/1977 | Manfanovsky | 342/159 |
| 4,453,218 | 6/1984 | Sperinde et al. | 364/572 |
| 4,466,067 | 8/1984 | Fontana | 364/516 |
| 4,587,620 | 5/1986 | Niimi et al. | 364/574 |

OTHER PUBLICATIONS

Gobunov et al., "Potential Use of Linear-Difference Filters for Flaw Detection", Sov. J. Nondeser. Tese (U.S.A.), vol. 16, No. 5, May 1980, pp. 325–330.

Primary Examiner—Errol A. Krass
Assistant Examiner—Brian M. Mattson
Attorney, Agent, or Firm—Ronald L. Taylor; A. W. Karambelas

[57] ABSTRACT

A five stage background filter circuit 10 is disclosed which is capable of responding to background radiation changes at speeds which are from one to two orders of magnitude faster than conventional prior filters. The invention utilizes a cross scan multiplexing technique in combination with filter circuitry depicted in schematic overview in FIG. 1. Circuit 10 includes a differential amplifier 12, a sample and hold device 14, a responsivity corrector 16, a recursive filter 18, and a background subtractor 20. Output signals 11 from a focal plane array of detectors (shown in FIG. 3) are passed through impedance matching input resistors 12a,b to an amplifier. A sample and hold circuit 14a cyclically selects and stores a signal received from first stage 12. The detector outputs are then normalized by responsivity corrector stage 16 which employs a digital-to-analog converter 16a and random access memory 16c. A threshold band comparison and time-out logic circuit 21 within background subtractor stage 20 controls the operation of recursive filter stage 18 in order to suppress signals due to sensed radiation bursts and to eliminate the unwanted, dynamically varying background radiation portion of the signal present at node 17b. A processed output signal present at node 20i is then passed to a target detection processor (not shown).

11 Claims, 19 Drawing Figures

CROSS SCAN BACKGROUND FILTER

CROSS SCAN BACKGROUND FILTER

FOCAL PLANE ARRAY

S/H & RESPONSIVITY CORRECTOR
16

DIFFERENTIAL AMPLIFIER
12

FPA COLUMN OUTPUT

S/H & RESPONSIVITY CORRECTOR   16
14

RECURSIVE FILTER AND SPIKE SUPPRESSOR 18

EXTREMELY HIGH SPEED, REAL-TIME BACKGROUND FILTER FOR RADIATION DETECTORS

BACKGROUND OF THE INVENTION

1. References to Related Patent Applications.

The present patent application is related to a copending patent application with U.S. Ser. No. 06/830,385 entitled "Array Correlation System for Radiation Detectors". This copending application by Edward L. Gussin, Richard E. Burney, Carl G. Pfeiffer, and James E. Justiss was also filed on Feb. 18, 1986 and is also assigned to the Hughes Aircraft Company. Two other pending patent applications, U.S. Ser. Nos. 683,983 "Noise Immune Infrared Readout Circuitry" and 682,112 "Integrating Capacitively Coupled Transimpedance Amplifier" are related to the present patent application. All rights to both of these related inventions are assigned to the Hughes Aircraft Company. The specifications and drawings of these related applications are hereby incorporated by reference.

2. Field of the Invention.

The present invention pertains to radiation detectors. More specifically, this invention provides a background filter for radiation sensors that responds extremely quickly to high frequency background variations. The invention employs a cross scan multiplexing technique to process output signals from a focal plane array.

3. Description of the Technology.

A radiation detector collects electromagnetic radiation from a scene which it views through a telescope and related optics and converts the received radiation into electrical output signals. These signals are then processed by circuitry which interprets the signals in order to determine the nature or identity of objects which are present in the scene. Detectors are often employed to search a scene for specific objects or targets which have particular properties or image characteristics. One of the fundamental problems encountered in searching a scene for a particular object with a matrix or array of radiation sensors is distinguishing radiation which emanates from the background of the scene from radiation which originates from a target. In the simplest case, an object such as a moving aircraft which moves across a clear sky can be distinguished from the background because the radiation from the sky is either relatively constant or is readily predictable. The radiant energy from the moving aircraft that would be perceived by a photosensitive or infrared detector would be easily distinguished from the constant background, since the image of the moving target would move across the many detectors in the sensor array. This varying signal would stand out clearly against the background signal from the sky, since the collected radiation that is not attributable to the target would comprise a relatively constant pattern of impinging energy on the detectors.

This simple case is severely complicated if the sensor array is not stationary. If a focal plane array of detectors is carried aboard a moving aircraft in order to attempt to detect other moving objects in the sky, the motion of the platform aircraft will itself impart motion to the perceived image of a target as it transits the detector array. As the platform aircraft moves, a multitude of mechanical vibrations severely impairs the ability of the signal processing circuitry associated with the detectors to identify targets and generate useful information about them. Vibrations are propagated by the craft's engines and are derived from the wings and fuselage as the ambient atmosphere rushes past the plane's exterior during flight. These systemic vibrations and jitter that are transmitted to the sensor platform can create unwanted signals which are enormous compared to the magnitude of signals that are produced by faint targets. The combination of signals from these systemic sources, inherent noise signals which originate within the detector crystals, and ambient radiation signals cna consequently overpower and obliterate image information received from targets which the viewer wishes to detect, observe, and track.

One approach which may be employed to solve this problem of lost information due to an extremely low signal to noise ratio is to try to determine what the total unwanted background signals will be ahead of time and then to subtract this prediction from the output produced by the detector array. The efficacy of this technique, however, depends entirely upon the quality and accuracy of the prediction of what the background will look like at some future time when a given scene is being viewed. Any shortcomings in the prediction will create spurious results which will impair the validity of information about the target that is devolved from the sensor output.

A far superior solution would be to evaluate the background of any viewed scene continuously and then compensate for the unwanted signals nearly instantaneously. The exceedingly valuable advantage of this technique is that real-time information about the condition of the background is always preferable to a prediction which may or may not correlate well with reality at any given moment.

A typical sensor array, such as the one schematically illustrated in FIG. 3, comprises a matrix of identical detectors deployed in a rectangular grid. This particular array includes ten columns, numbered C1 through C10, arranged in sixty-four rows, identified as R1 through R64. This assembly of six hundred and forty independent, physically separate regions is electrically coupled to readout circuitry immediately below the detector crystals. This circuitry accumulates electrical signals proceeding from each of the crystals after impinging photons strike the face of the detectors and are converted into an electrical current. A telescopic arrangement of lenses and mirrors is used to collect radiation and focus it upon this focal plane array. A moving mirror may be placed in the input beam path to direct incident radiation across the grid of detectors. The reciprocating motion of this scanning mirror or the motion of the entire sensor system enables the fixed sensors to receive radiation from many different directions over a preselected arc or field of view. Each time the scanning mirror guides the beam of collected radiation across the entire width of the array, the mirror completes one scanning cycle, quickly moves back to its starting position, and repeats its partial rotation in order to sweep the next sequential view of the scene across the sensors.

In order to evaluate the background radiation of a scene viewed by this array, many detector outputs would have to be sampled, averaged, and filtered to produce a background signal which would then be subtracted from the total sensor output. Previous systems have been designed to evaluate background radiation by averaging the sampled outputs of a row or rows of detectors in this type of rectangular array. Since a typical scanning speed utilized in this type of detector array would be about three degrees of arc per second and since such arrays are limited by relatively small detector sizes and short sample times, the utility of this technique of averaging the outputs of detectors in a horizontal group or groups is limited to situations where the background does not change rapidly. If the background changes faster than the time it takes to complete a substantial portion of a full scanning cycle, the averaging technique produces inaccurate results, since the background that each detector pixel views would be slightly different. One possible variation to this approach would be to increase the scanning speed of the mirror so that a row of detectors receives radiation from the scene over a shorter interval, but the constraints of current technology require a minimum dwell time over the boundaries of each sensor so that the incident photons may be converted into an electrical current which is large enough to process.

No previous invention known to the Applicants solves the problem of obtaining an accurate, continuous, and virtually real-time evaluation of unwanted background energy. No known prior method or apparatus provides an effective and comprehensive solution which addresses all of the complex aspects of achieving a resolution of target information by separating detector output signals which vary randomly at a speed which is much higher than the scanning speed of the detector array. Such a solution to this problem would satisfy a long felt need experienced by the electronics and aerospace industries for over three decades.

A truly practical and reliable means for producing an efficacious, high speed background filter for radiation detectors would constitute a major advancement in the electronics field. Manufacturers of optical sensors and thermal imaging equipment could employ such an innovative apparatus and method to produce devices which would be capable of detecting and tracking objects with greater accuracy and sensitivity than is currently possible with currently available prior devices. Such an invention would ideally be suited to operate in cooperation with a wide variety of computing systems and would perform consistently and reliably over a wide range of operating conditions and system applications. An extremely fast background filter would also satisfy the rigorous demands of ballistic missile defense systems. An invention which enables aerospace electronics designers to deploy highly accurate and sensitive background filter circuitry in an orbital space defense system would most certainly constitute a major technological advancement in the electronics arts.

SUMMARY OF THE INVENTION

The aim of the present invention is to help accomplish this major technological advancement. The Huges Extremely High Speed, Real-Time Background Filter for Radiation Detectors enables designers of radiation detection systems to produce devices which are capable of sensing and compensating for unwanted background radiation and the spurious signals which a moving detector platform generates. The present invention employs a cross scan multiplexing technique to sample outputs from detectors in a ten column or channel focal plane array column by column. The output signals are fed to a signal processing system through readout circuitry which is coupled to the focal plane array using indium bump connection techniques. After leaving each focal plane array column, the gain of the detector output signals is enhanced by a differential amplifier. The signals are sequentially stored in a sample and hold stage and thereafter each individually compensated by a predetermined amount equal to a deviation, from a reference sensitivity, of the sensitivity of a corresponding detector element. This compensation is performed by a responsivity corrector stage. A recursive filter stage, which includes a low pass filter that has a time constant less than the sample time interval of the detectors, develops a scene background estimate that is constantly updated to correct for rapid variations. These rapid variations are, in part, caused by the jitter of the focal plane platform which is mounted on a moving aircraft. Finally, the background estimate is subtracted from the total signal and is then relayed to a target detection processor. The background estimate remains extremely accurate even if the detectors encounter severe radiation bursts, since the system includes a window threshold and comparison circuit which limits the inputs to the low pass filter. This virtually real-time background estimation and subtraction method enables the target detection processor system to perceive and track targets that are extremely faint compared to the magnitude of signals generated by a very bright background. The present invention comprises a substantial and important advancement over previous techniques which involve sampling detector arrays row by row after a substantially complete scanning cycle. Previous techniques require time constants which are many times greater than the detector sampling time in order to preserve target signal to noise ratios. This requirement imposes serious speed constraints on the ability of prior filters to respond to sudden changes in the ambient background.

It is, therefore, an object of the present invention to provide methods and apparatus for an extremely high speed background filter for radiation detectors.

Another object of this invention is to provide a reliable means of detecting and tracking targets which are many times fainter than the background against which they appear in a scene.

Still another object of the present invention is to provide a means of detecting targets in an environment which may include severe radiation bursts which would otherwise confound or disable previous detection devices.

Yet another object of the invention is to provide a radiation sensing system which operates virtually instantaneously without depending upon enormous data processing and data storage devices for long complex calculations which would cause intolerable delays in the target detection process.

It is also an object of this invention to provide a technique which takes advantage of a cross scan multiplexing method which greatly enhances the ability of a filter circuit to respond quickly to changes in background radiation perceived by a focal plane array of radiation detectors.

Another object of the present invention is to improve the performance of currently available, cold-optics, long wave infrared radiation sensing equipment.

Still another object of this invention is to provide filtering methods and apparatus which are extremely efficient and incorporate a minimum number of electronic components so that the present invention may be deployed in a wide variety of environments and operating scenarios.

It is a further object of this invention to provide a technique which enables personnel aboard a moving aircraft to perform accurate target extraction and analysis functions under extremely demanding conditions of mechanical motion and dynamically varying background input radiation.

It is also an object of the present invention to cut down the mass and volume of detector signal processing systems in order to fabricate systems which can be economically placed in an orbital environment.

An appreciation of other aims and objects of the present invention and a more complete and comprehensive understanding of this invention may be achieved by studying the following description of a preferred embodiment and by referring to the accompanying drawings.

DESCRIPTION OF A PREFERRED EMBODIMENT

Figure 1:
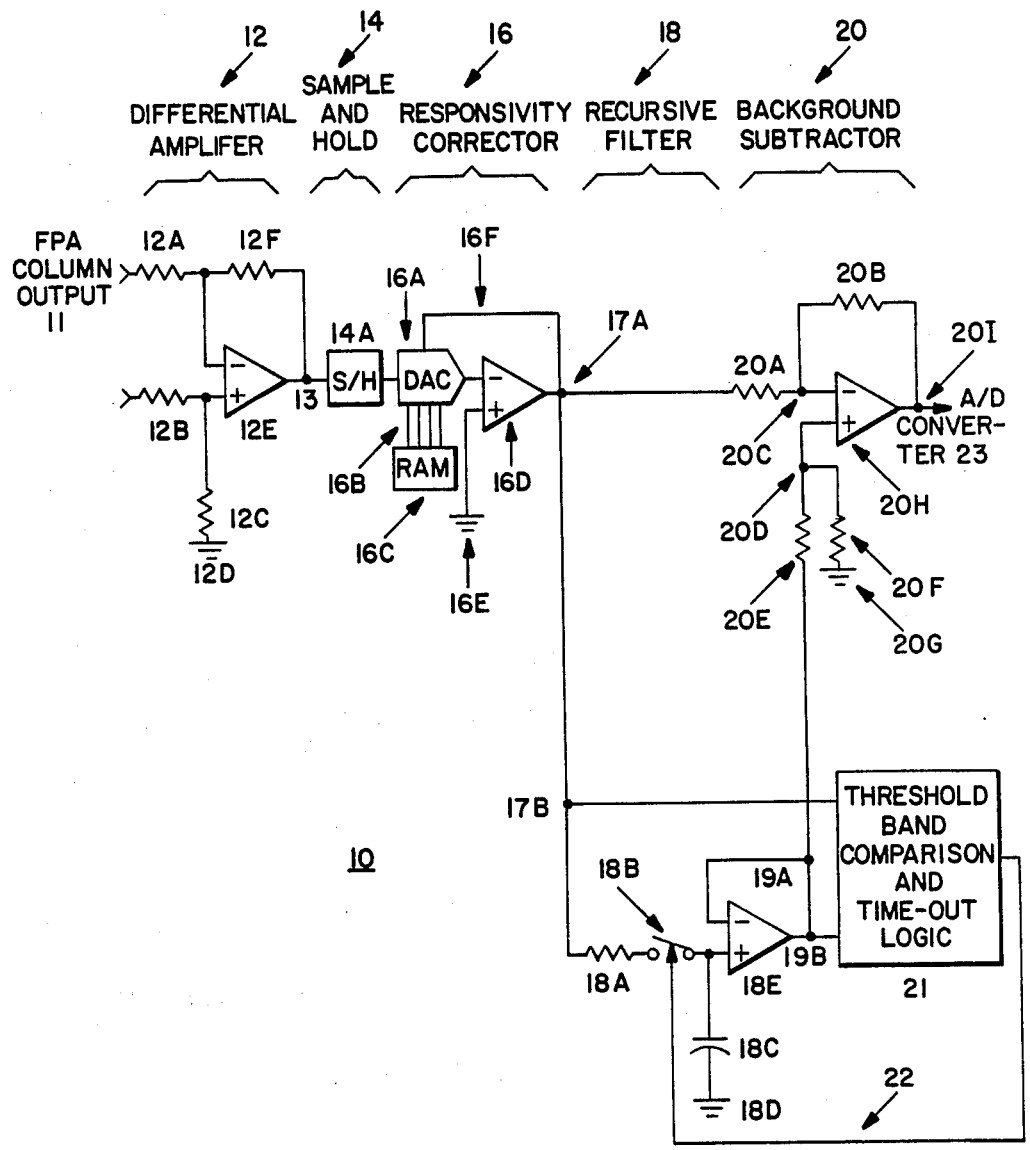
FIG. 1 is a schematic overview of the five circuit stages comprising the present invention.

FIG. 1 is a schematic overview of the Hughes Extremely High Speed Background Filter for Radiation Detectors 10. The circuit 10 includes five stages: a differential amplifier 12, a sample and hold device 14, a responsivity corrector 16, a recursive filter 18, and a background subtractor 20. Output signals 11 from columns of detectors in a focal plane array (shown in FIG. 3) are passed through input resistors 12a and 12b to an amplifier 12e. Resistor 12c connects input resistor 12b and the positive input terminal of the amplifier 12e to ground in order to provide proper impedance matching. A feedback resistor 12f couples input resistor 12a and the negative input terminal of amplifier 12e to the output of the amplifier 12e at junction 13.

Amplifier 12e serves as a buffer and boosts detector signals which are sequentially collected from the focal plane array. Each of the ten columns of the array are sampled in turn, so that the background estimate is computed on the basis of the outputs of a viewing group of sixty-four virtually simultaneous independent measurements in each column. Each detector requires on the order of one hundred microseconds to integrate the photons that are collected and develop a proportional output signal.

Junction 13 constitutes the input of the sample and hold device 14a which samples the continuously changing analog signals from the detector output periodically during each cycle. The sample and hold device is a means of selecting signals by periodically and cyclically capturing and updating the input present at junction 13. It extracts a signal, temporarily stores the elicited value, and then extracts another signal. Each time the sample and hold device 14 samples a signal, one sample or evaluation cycle is completed. Circuit 14 provides the circuit 10 with an evaluation group of stable detector output voltages by sampling during roughly one half of the cycle and holding the sampled data during the following half.

The third stage of circuit 10 is a responsivity corrector 16 including a digital-to-analog converter 16a and a random access memory 16b coupled to the digital-to-analog converter 16a. The output of converter 16a is connected to the negative terminal of an amplifier 16d. The positive terminal of amplifier 16d is coupled to ground 16e. A feedback loop 16f connects converter 16a to the output of amplifier 16d at node 17a.

The responsivity corrector 16 compensates for the variations in sensitivity of each of the detectors in the focal plane array. When each detector crystal is subjected to a uniform beam of constant radiant energy, each detector will produce a slightly different electrical output due to systemic discrepancies in the physical constitution of the crystal. In order to correct for these disparities among the six hundred and forty sensors in the array, their outputs are normalized in the third stage of the circuit illustrated in FIG. 1 through the use of a random access memory 16c. A coefficient which equalizes the tested response of each detector is stored in memory 16c, is recalled when the output of the appropriate detector is being evaluated, and is used to weight the signal value which is sampled from each detector. Converter 16a and amplifier 16d then develop a voltage at node 17a which is the input signal to both the fourth and fifth stages of circuit 10.

The recursive filter 18 functions as a separating means to eliminate that portion of the total signal which is due to background radiation and as a spike suppression means. This fourth stage of circuit 10 discriminates among various components of the total signal present at junction 17b. It includes an amplifier 18e and a low pass filter comprising resistor 18a and capacitor 18c which is coupled to ground 18d. The negative terminal of amplifier 18e utilizes a feedback loop which is connected to the fifth stage of circuit 10 through node 19a. The values of resistor 18a and capacitor 18c are selected so that mechanical vibrations which propagate through the aircraft and which are picked up by the focal plane array are rejected and do not pass to the target detection processor at the output end of circuit 10. Information about the frequency of the jitter produced by the engines, airframe, gimbals, and telescope can be obtained by performing various forms of analysis or inflight measurements. The values for the filter are then selected accordingly.

The spike suppression function is performed by the threshold band comparison and time-out logic subcircuit 21 which is coupled to the low pass filter 18a, 18c at nodes 17b and 19b and via link 22 and switch 18b. If the threshold comparator senses an input at junction 17b which exceeds a difference voltage that depends upon previous background voltage levels, switch 18b is opened, recursive filter 18 is not updated, and the disjunction operation of the low pass filter 18a is temporarily suspended. The preselected voltage level which is used for comparison is a stream of past operating values which constitutes the immediate past history of the inputs that have been recently perceived at node 17b plus a difference threshold value. The switch 18b remains open until the voltage at node 17b falls below the threshold. The threshold band comparison and time-out logic subcircuit 21 is programmed, however, to close switch 18b on every fifteenth sample. The upper and lower values that define the operating parameters of the threshold band comparison and time-out logic circuit 21 may be referred to as a threshold window, since the circuit creates a range or spectrum of values which determines when the filter 18 is updated. This provision for a cyclical reset which disengages and then re-engages filter 18 is required in order to enable proper operation when the system is turned on, initialized, or when the background changes radically.

Background subtractor 20 senses a signal through resistor 20a at junction 17a which represents the unwanted component of the total output that includes information about the targets, background, and random noise. Amplifier 20h works in conjunction with feedback resistor 20b and connecting resistors 20e and 20f, which couple the background subtractor 20 to recursive filter and spike suppressor 18, and performs the subtraction function. The output at junction 20i contains information about the targets which have exceeded the threshold criteria programmed into recursive filter 18, but no longer contains information generated by background radiation. This output of processed signals is then fed to an analog-to-digital converter 23 (not shown) which prepares the data signal for analysis by a target detection processor (not shown).

Figure 2:
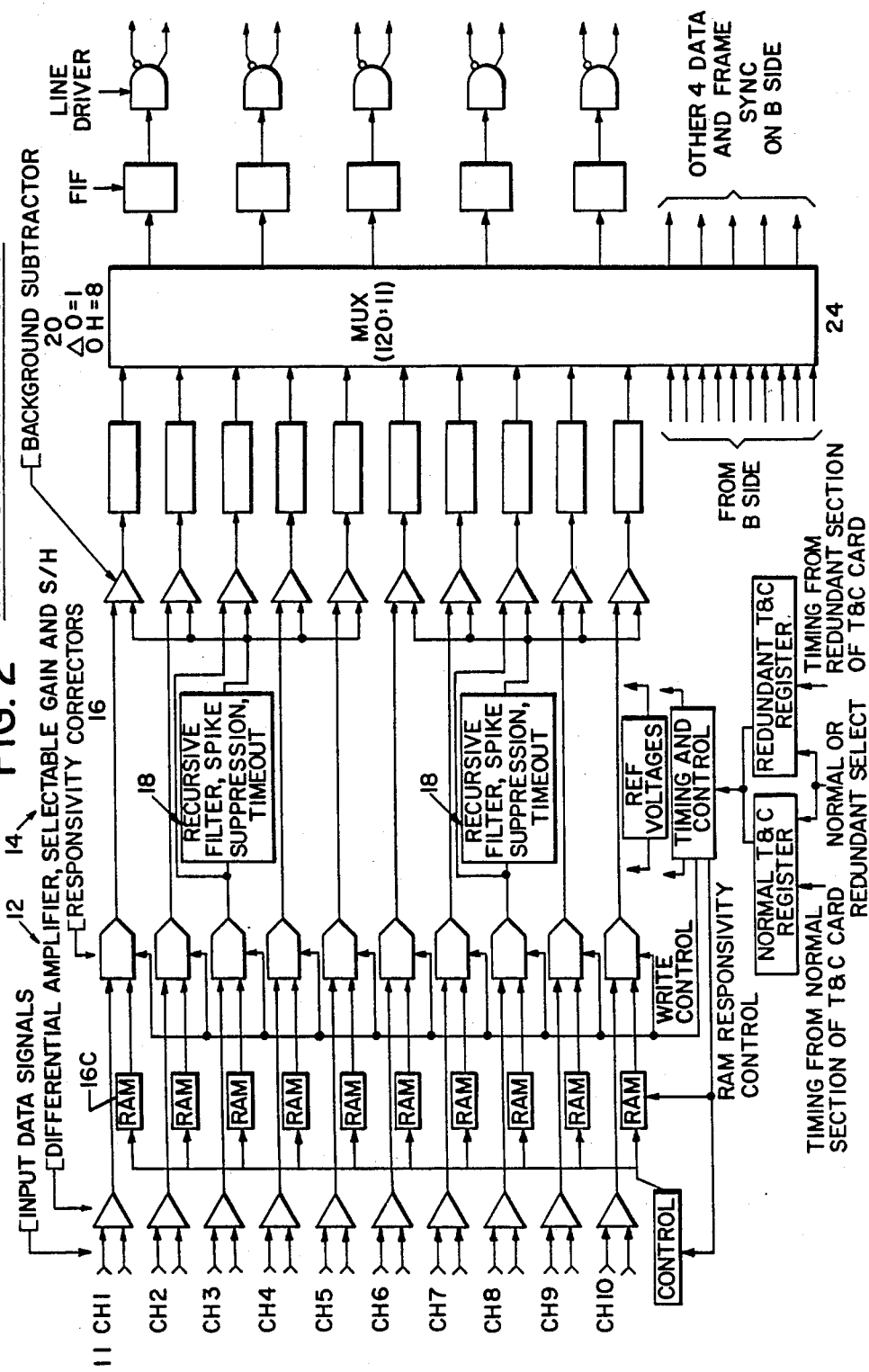
FIG. 2 is a larger schematic illustration of the signal processing circuitry for an entire radiation detector system which incorporates ten of the systems depicted in FIG. 1.

FIG. 2 shows a larger view of a radiation detection system which includes ten circuits (for ten channels of signals) comprising the present invention.

Figure 3:
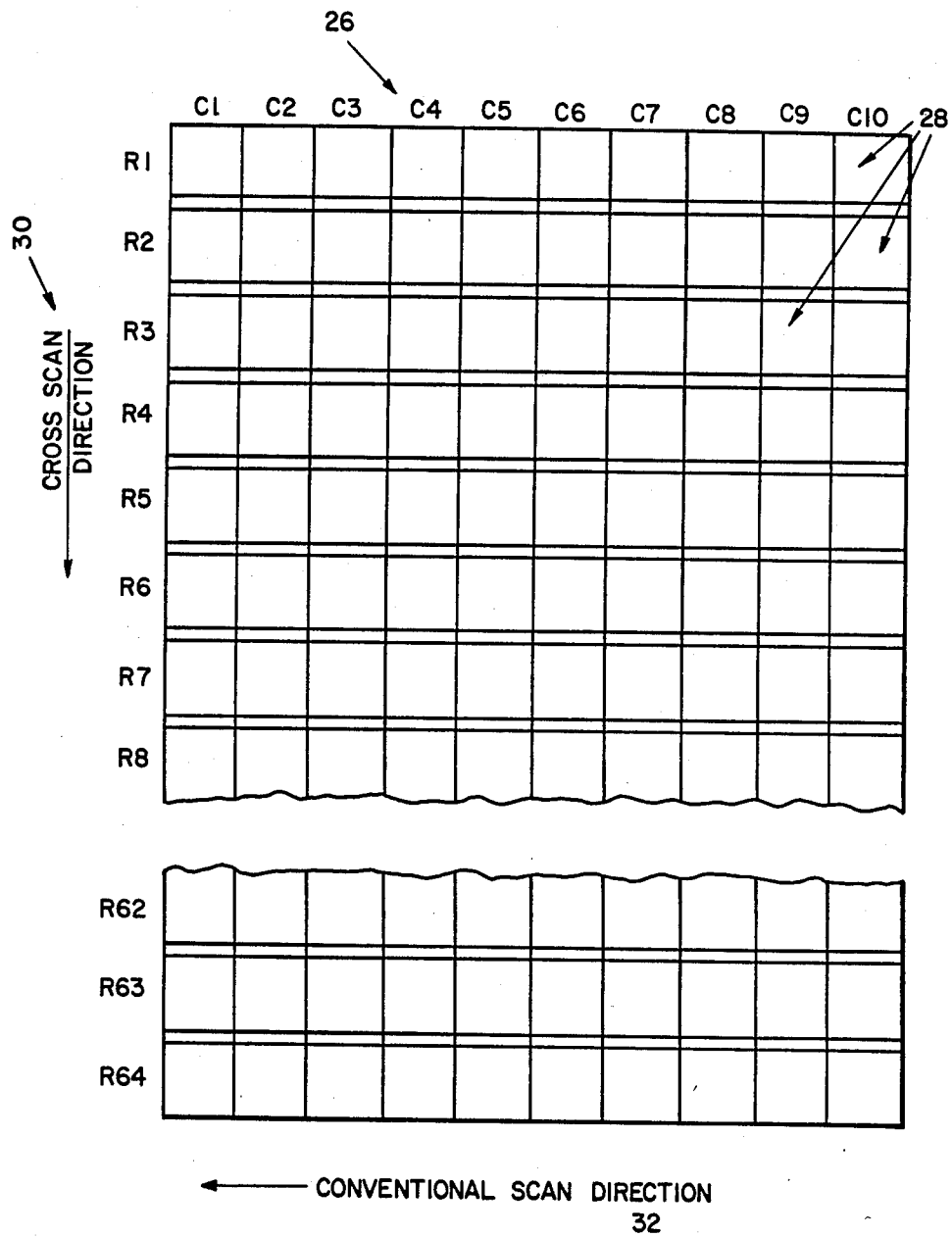
FIG. 3 is a schematic depiction of a focal plane array having ten rows and sixty-four columns which is connected to the system shown in FIG. 2 through read-out circuitry below the focal plane array.

FIG. 3 depicts a simplified focal plane array 26 arranged in ten columns labeled C1 through C10 and sixty-four rows marked R1 through R64. Each square 28 in the array represents a physically separate sensor that views a scene. The cross scan direction 30 is along columns of the array 26 from top to bottom and is perpendicular to the scan direction 32 which sweeps across the rows of the detectors, in this case from right to left.

Figure 4:
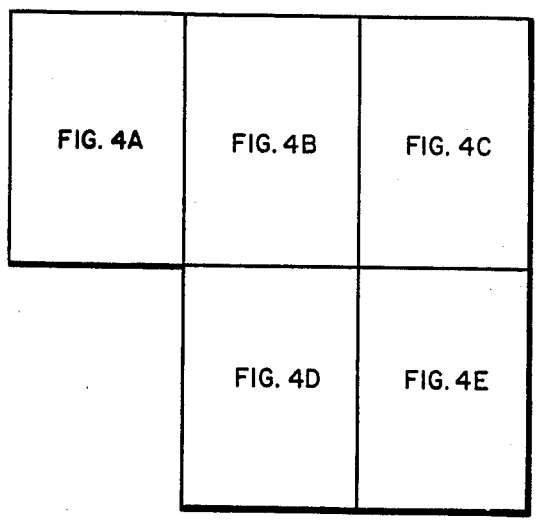
FIG. 4 comprising of FIGS. 4A-4E is a detailed schematic diagram of the differential amplifier, sample and hold, and responsivity corrector stages of the circuit shown in FIG. 1.

FIG. 4 contains a detailed schematic circuit diagram of the differential amplifier stage 12, sample and hold device 14, and responsivity corrector 16 which are schematically illustrated in brief in FIG. 1.

Figure 5:
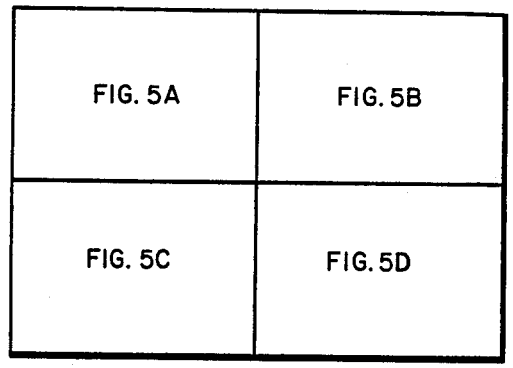
FIG. 5 comprising of FIGS. 5A-5D is a detailed schematic diagram of the recursive filter stage of the circuit shown in FIG. 1.

FIG. 5 contains a detailed schematic circuit diagram of the recursive filter and spike suppressor 18 which is schematically illustrated in brief in FIG. 1.

Figure 6:
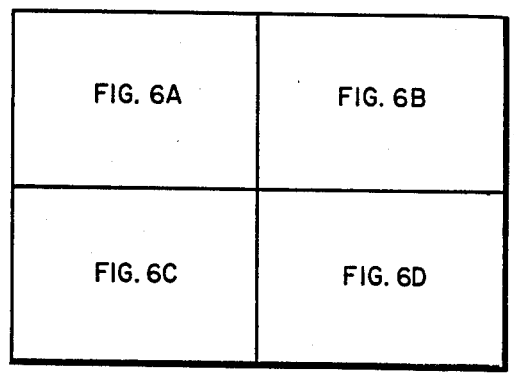
FIG. 6 comprising of FIGS. 6A-6D is a detailed schematic diagram of the background substractor stage of the circuit shown in FIG. 1.
Figure 4A:
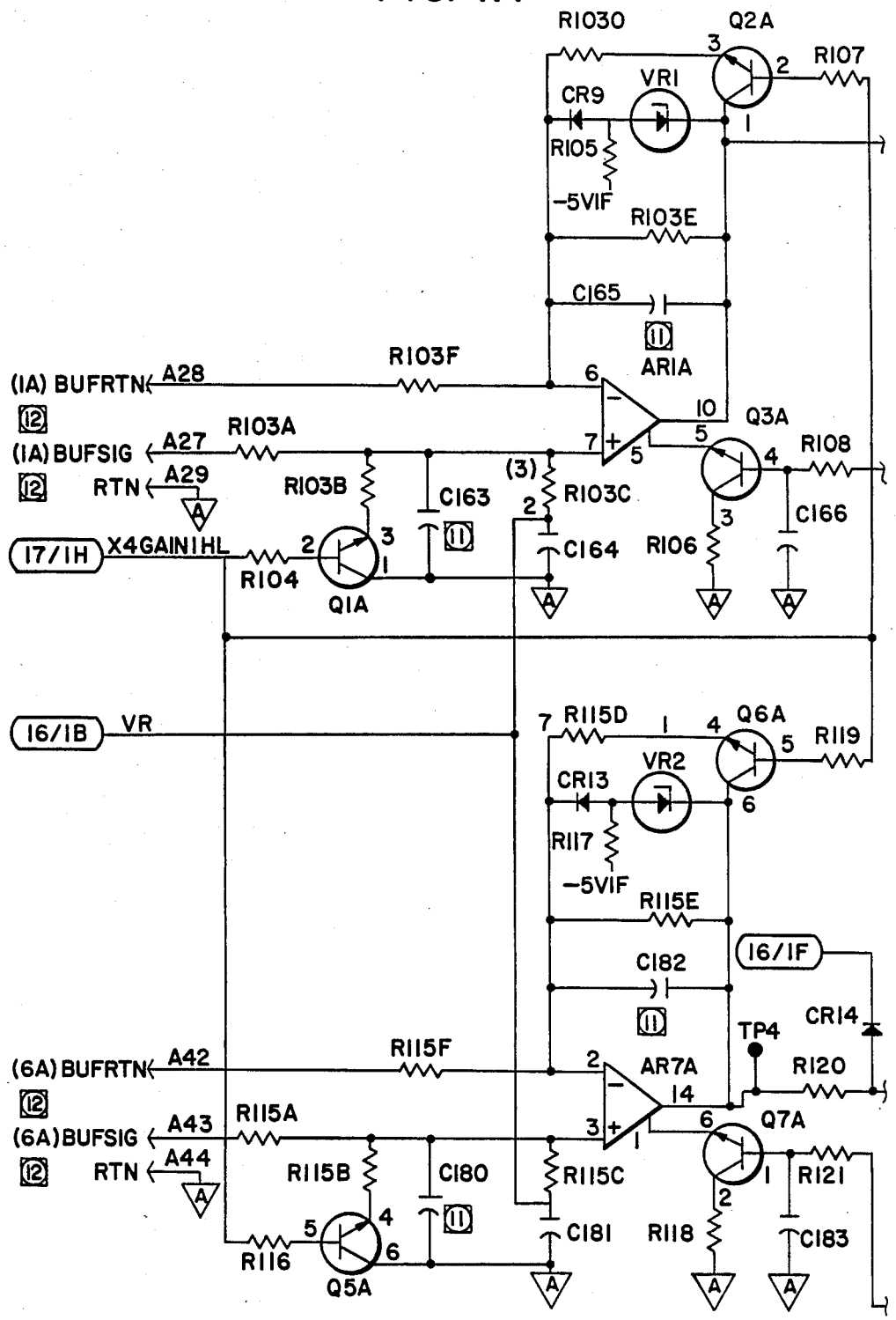
Figure 4B:
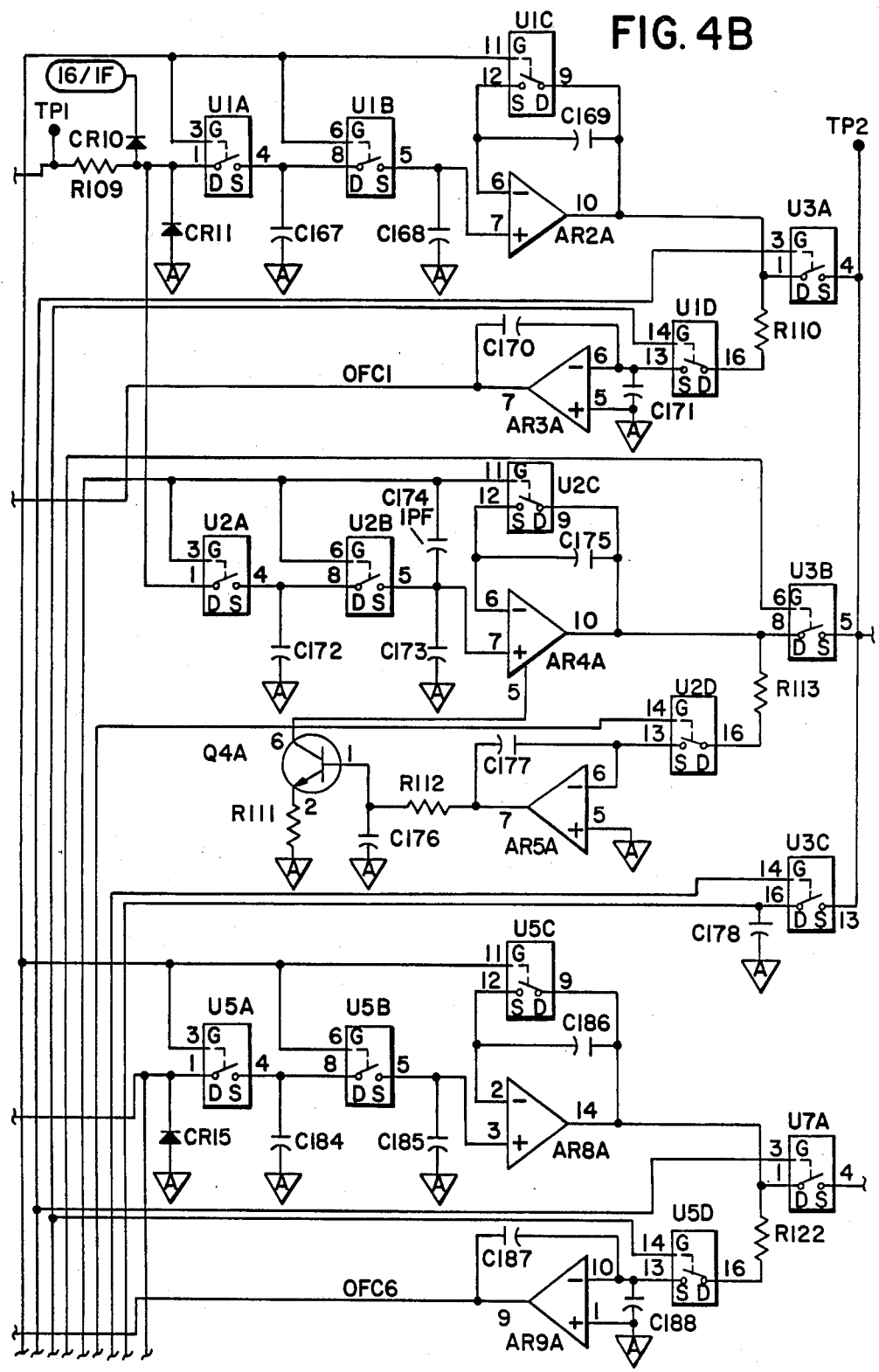
Figure 4C:
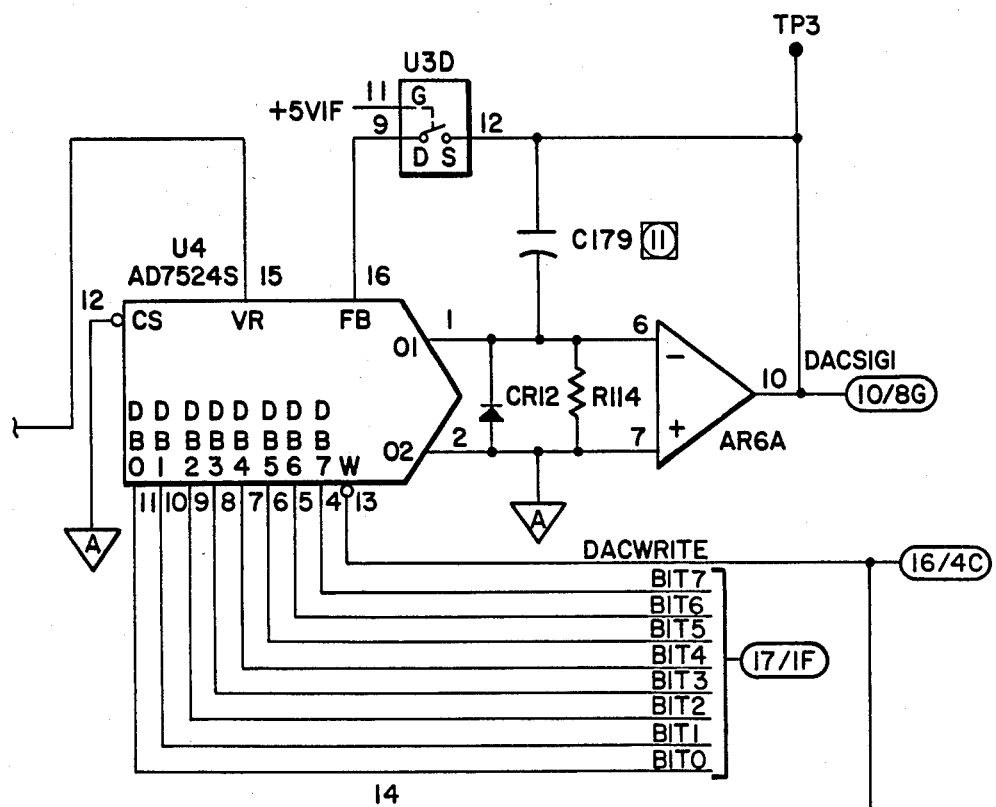
Figure 4D:
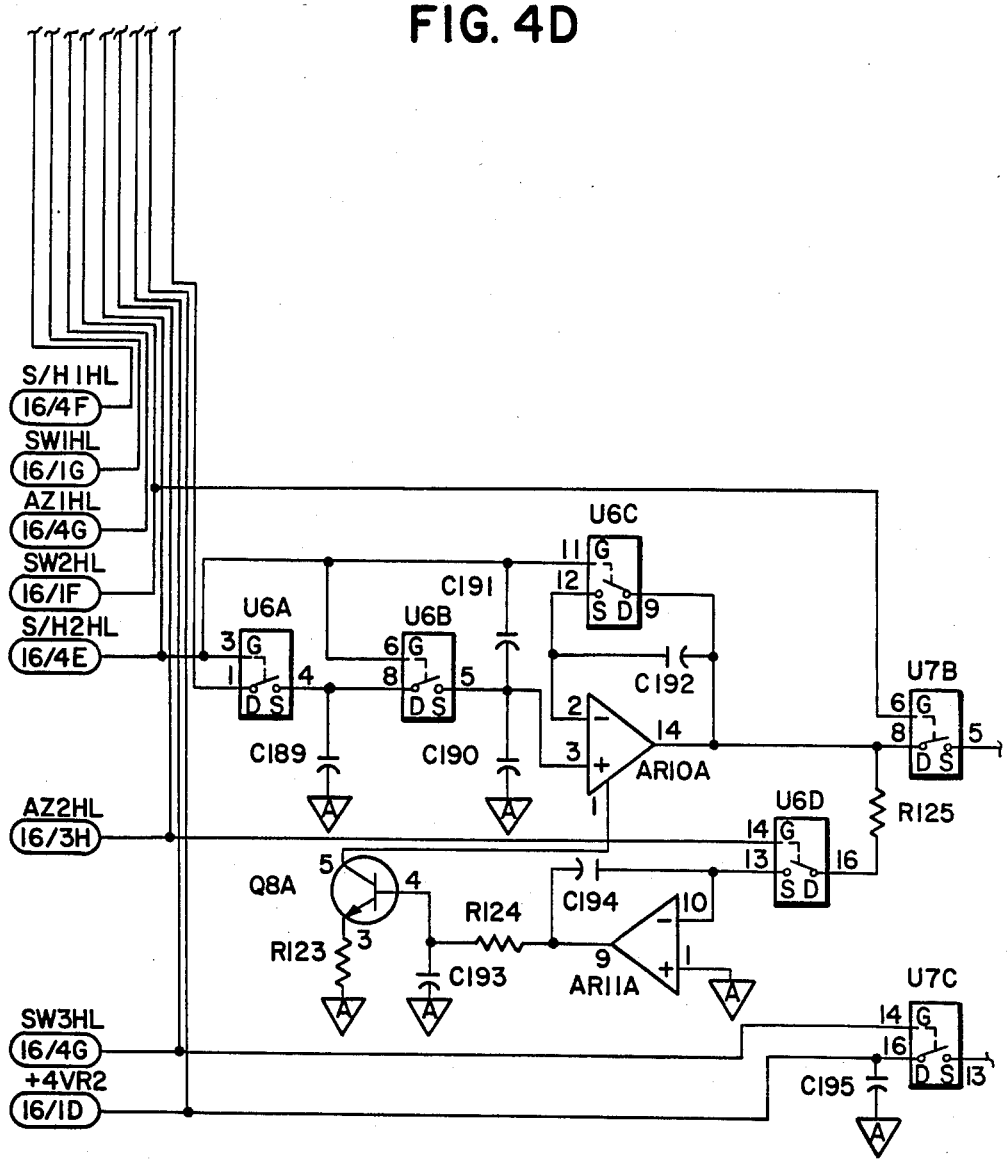
Figure 4E:
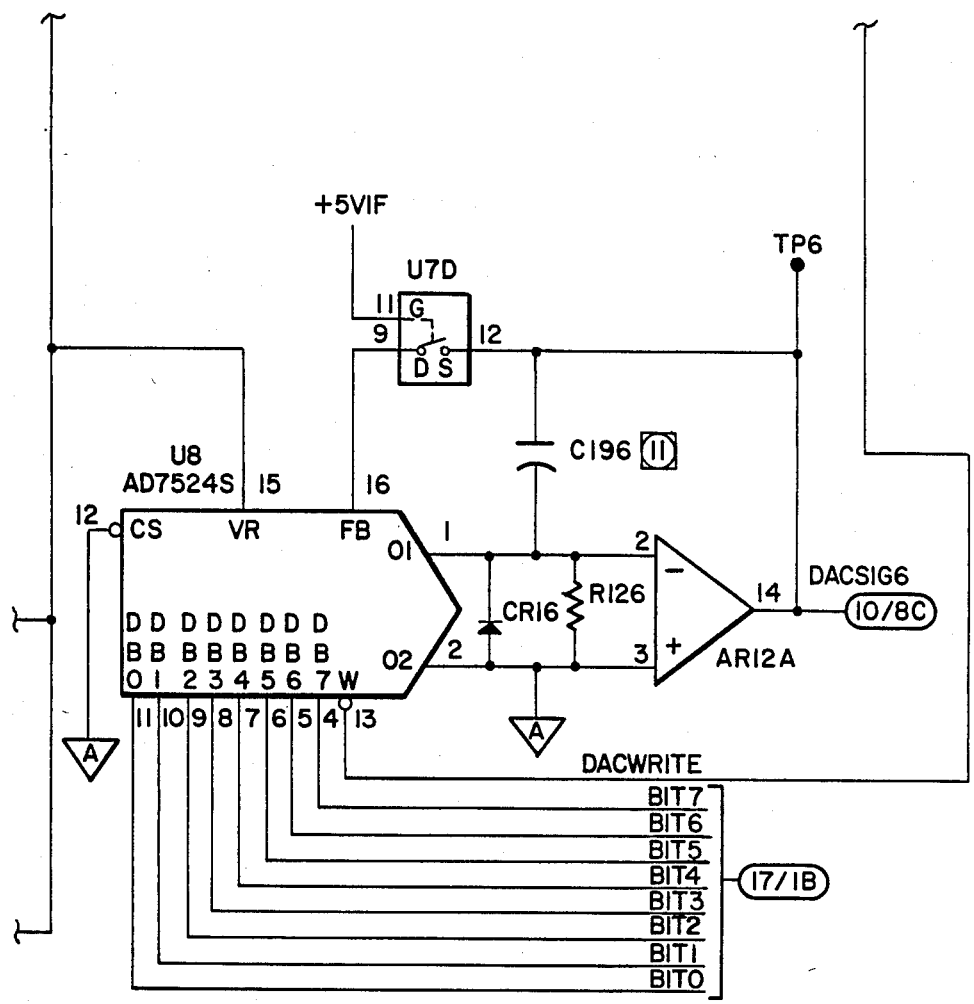
Figure 5A:
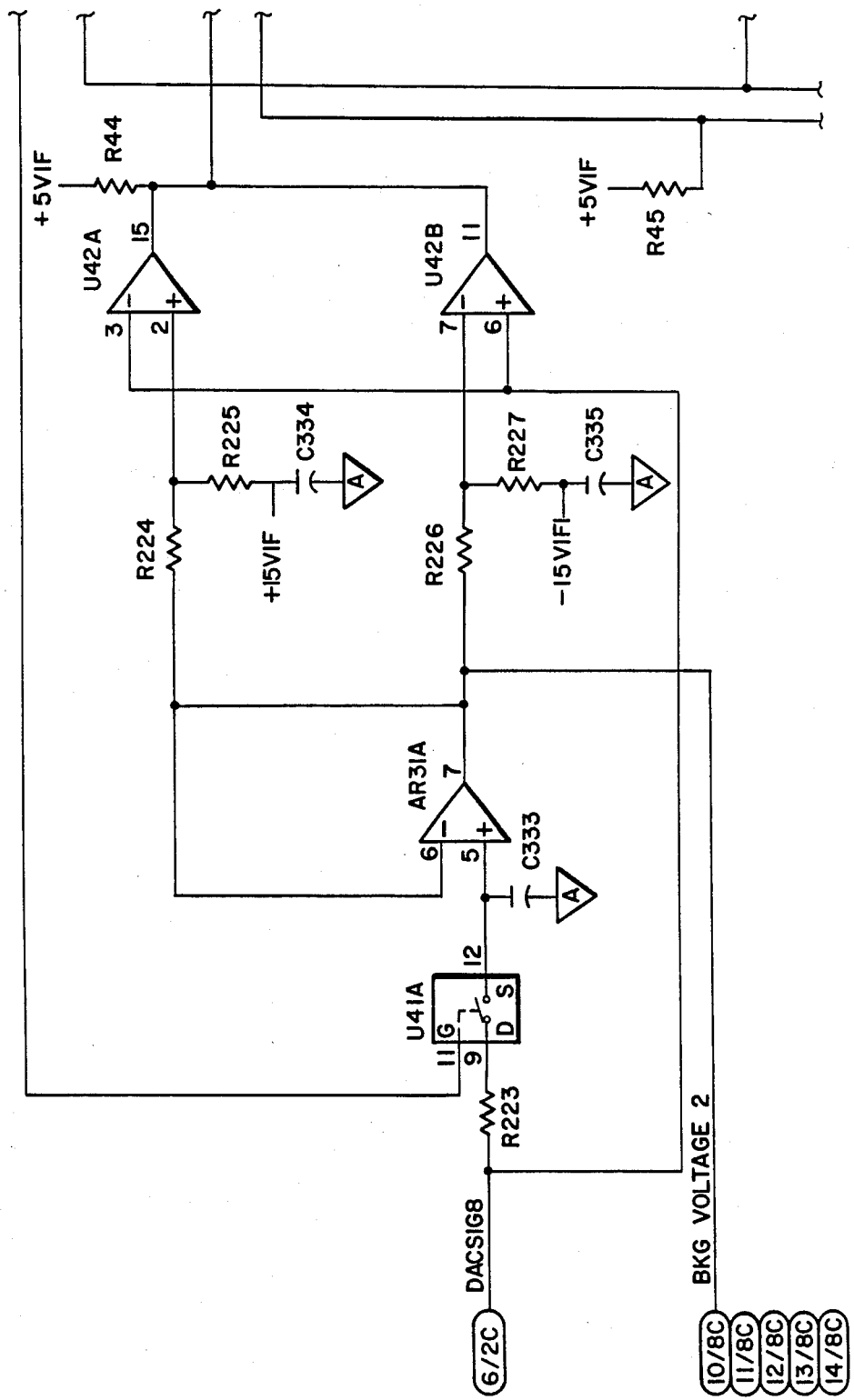
Figure 5B:
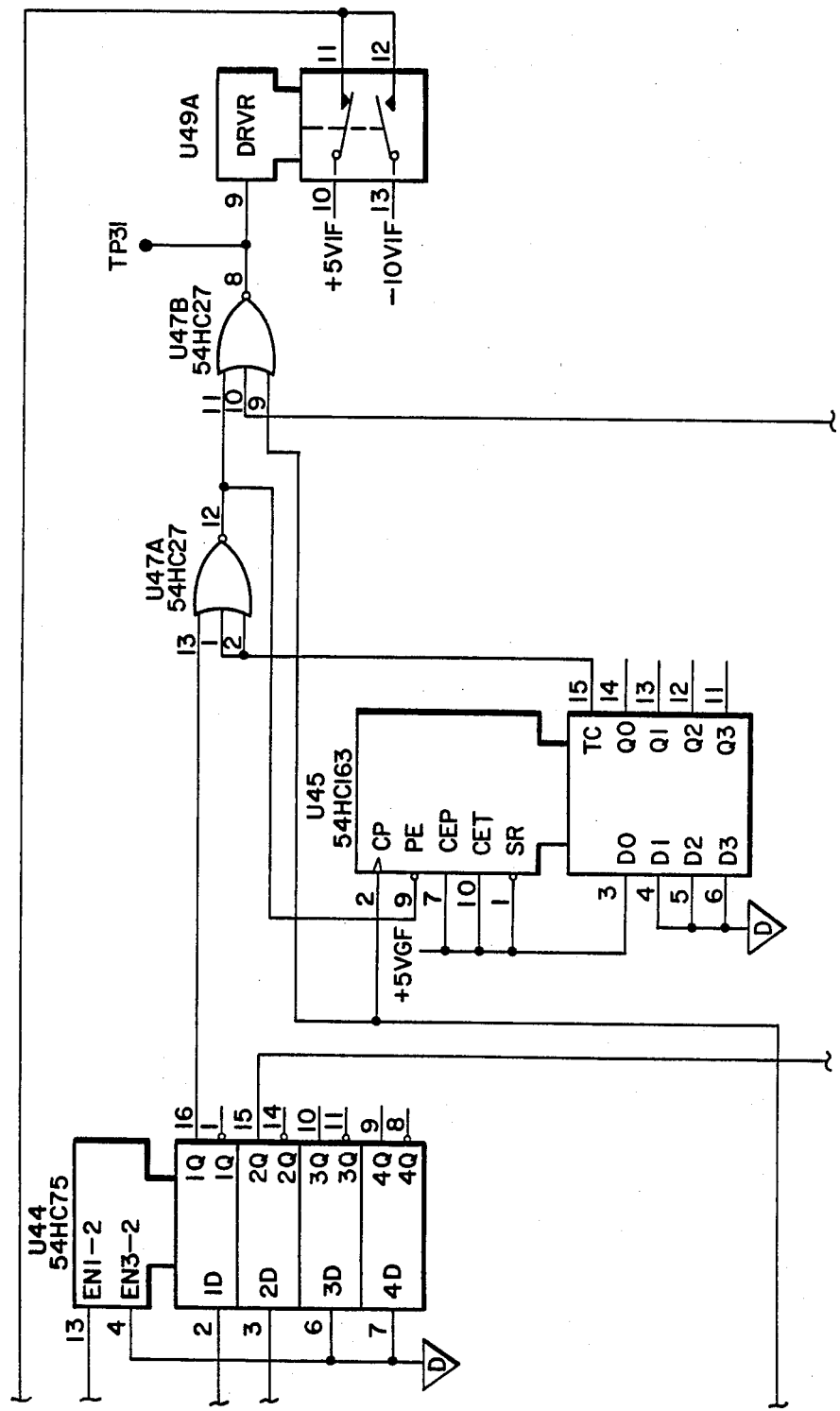
Figure 5C:
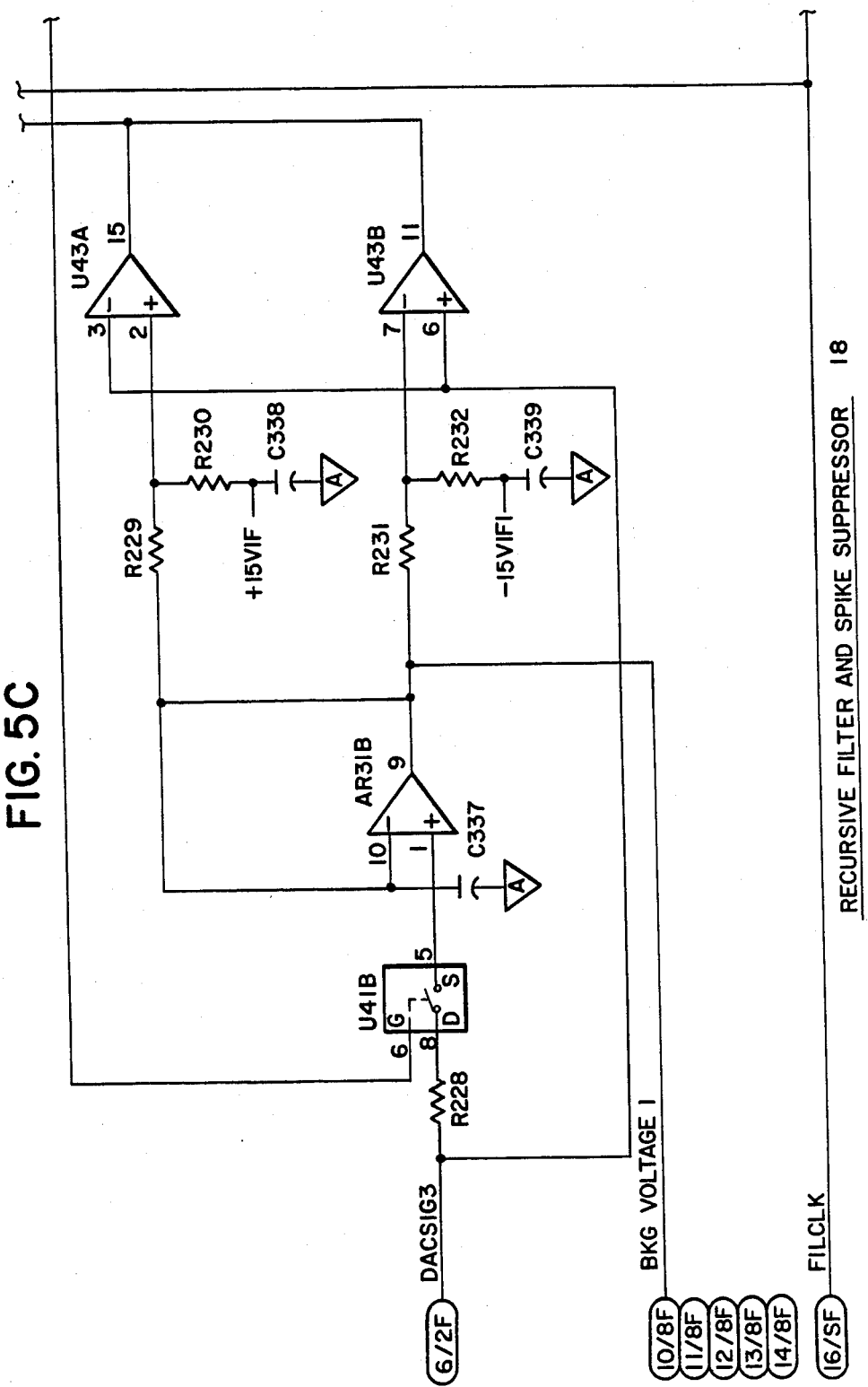
Figure 5D:
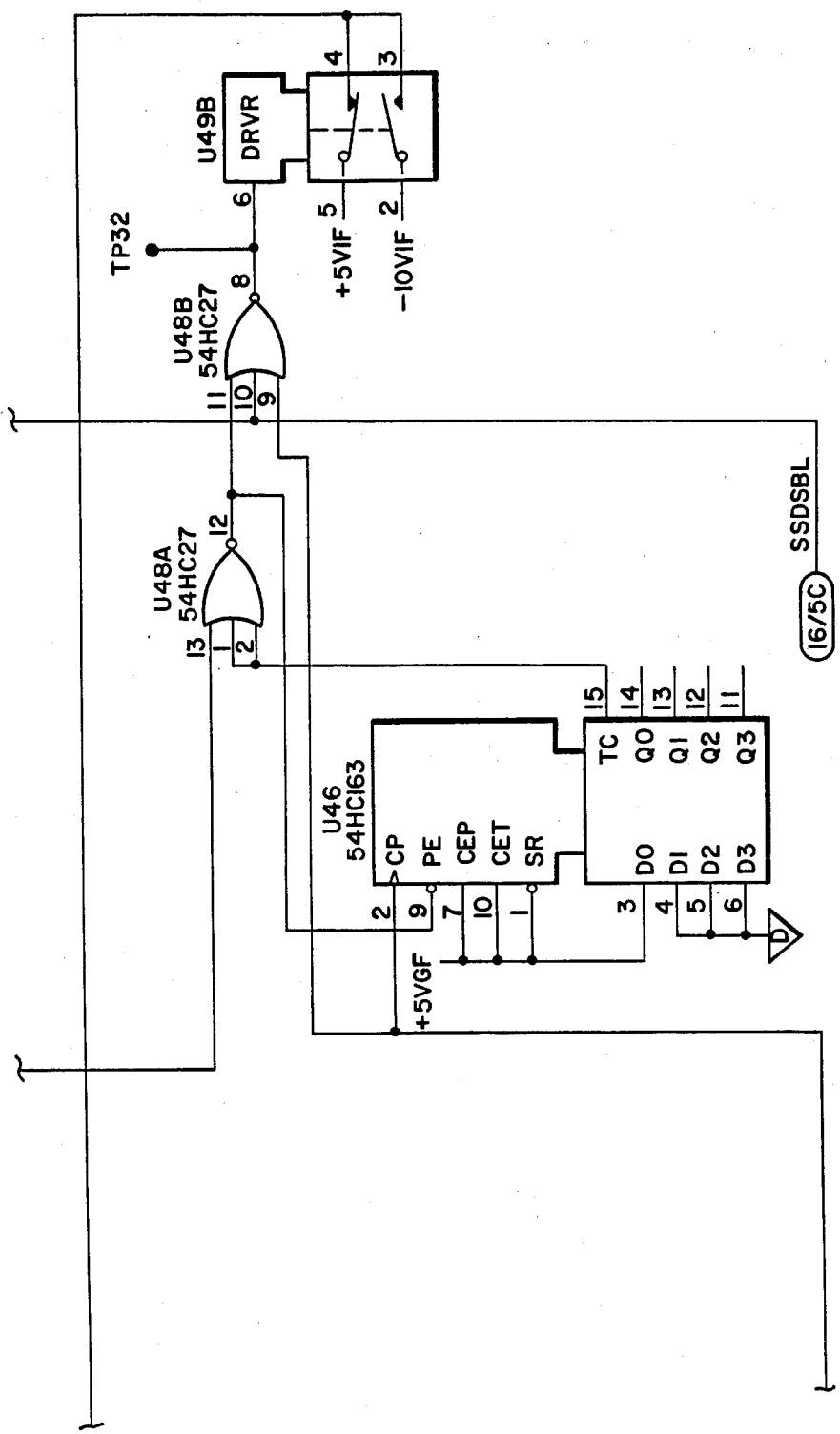
Figure 6A:
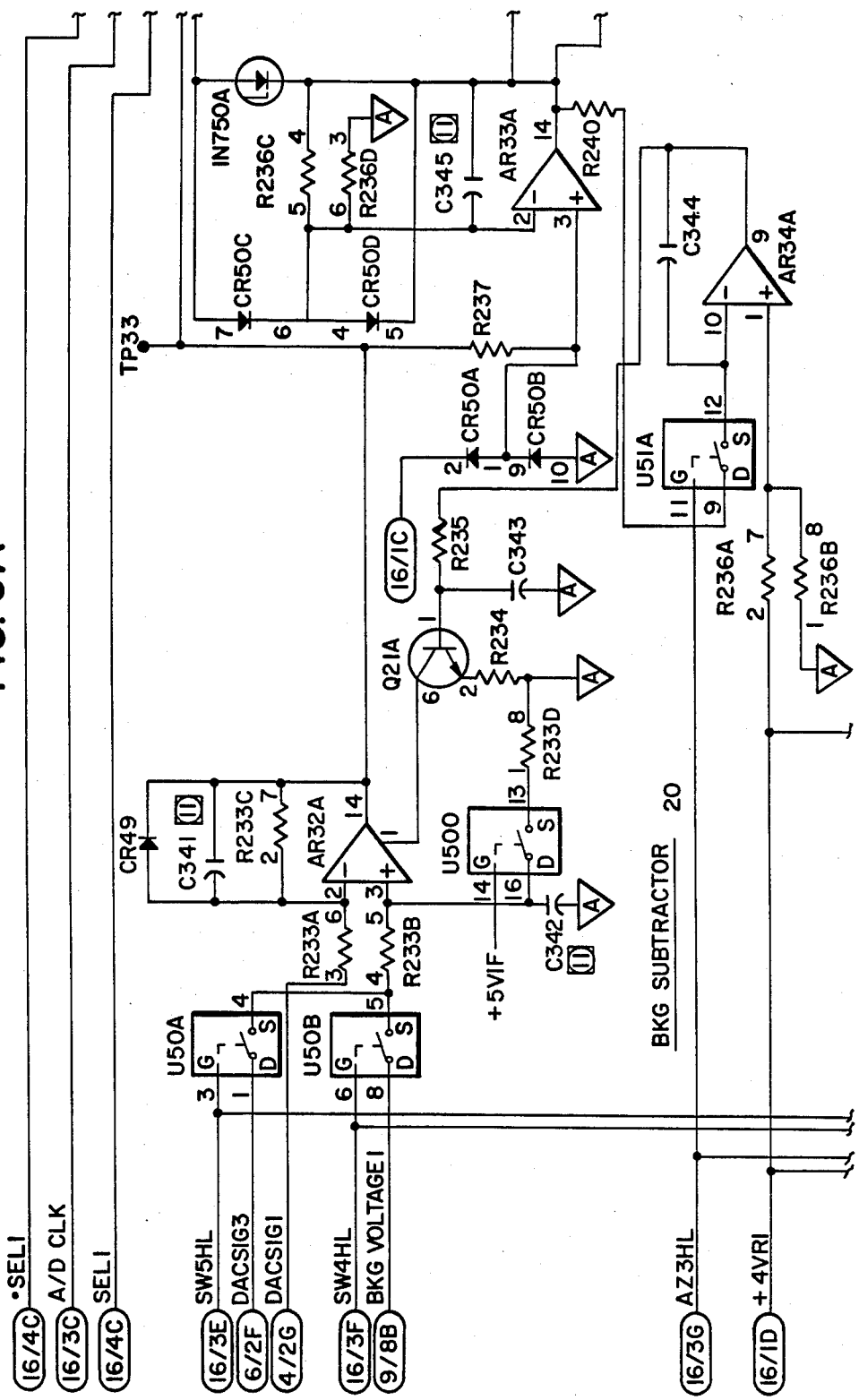
Figure 6B:
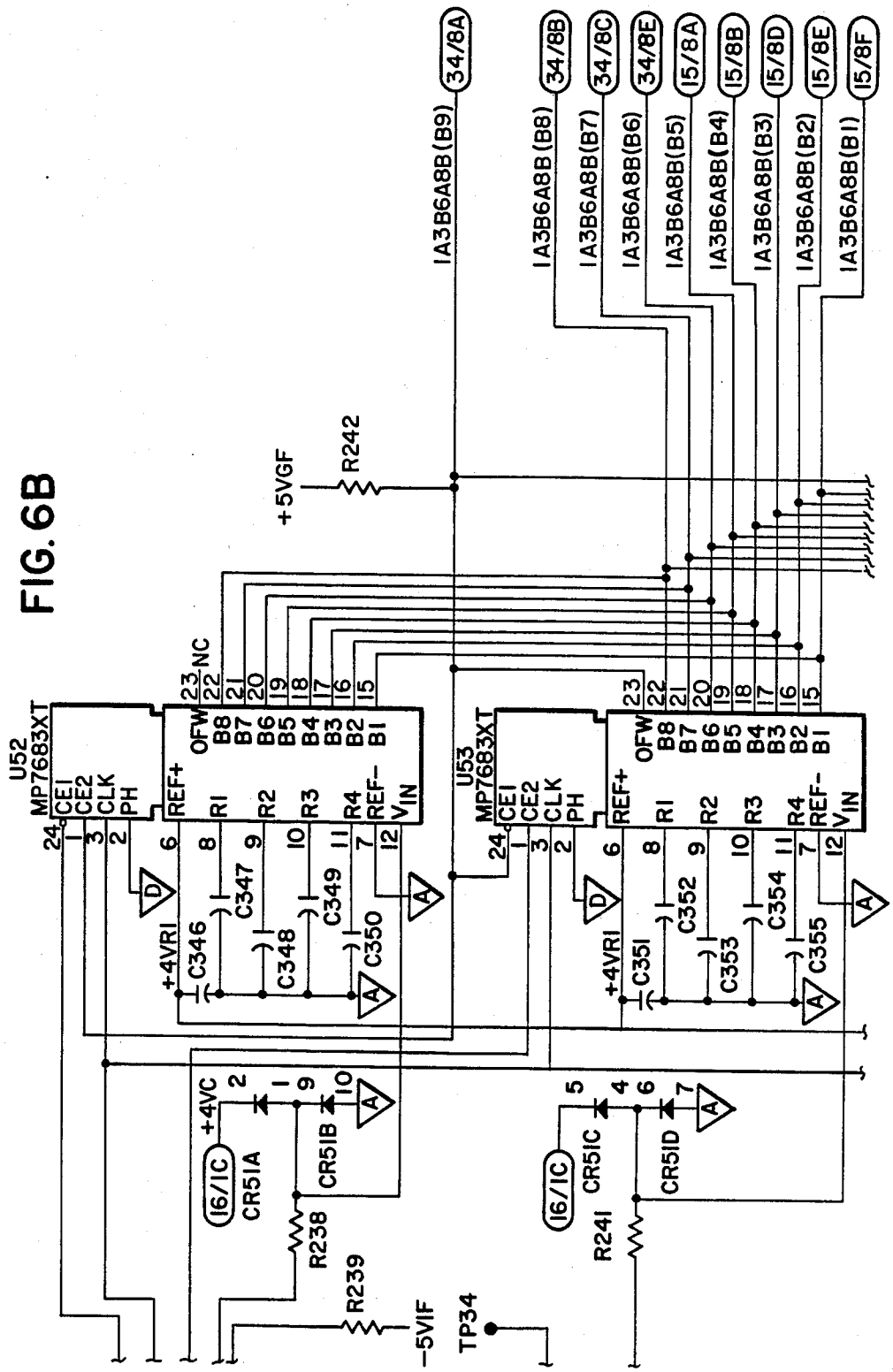
Figure 6C:
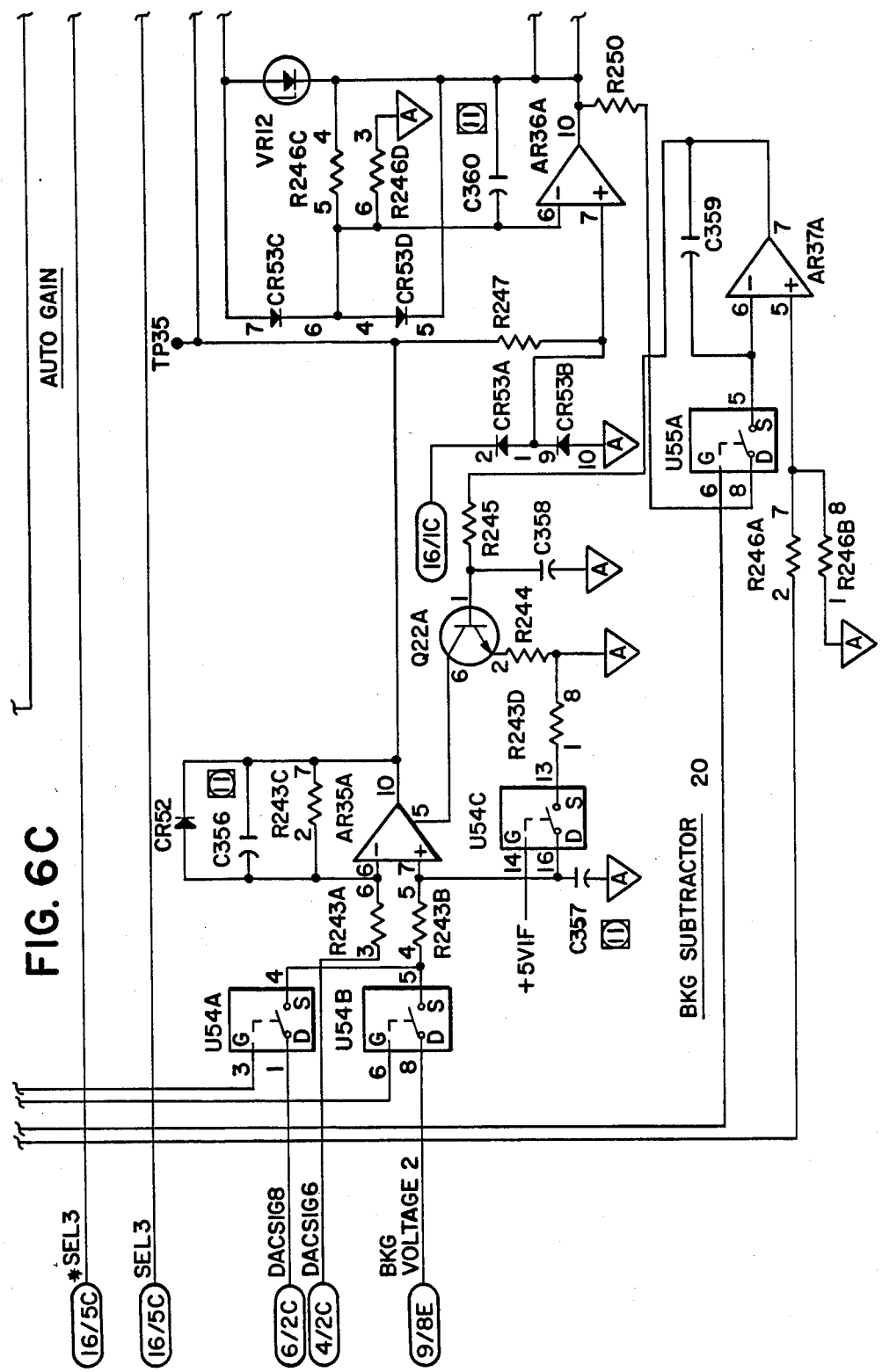
Figure 6D:
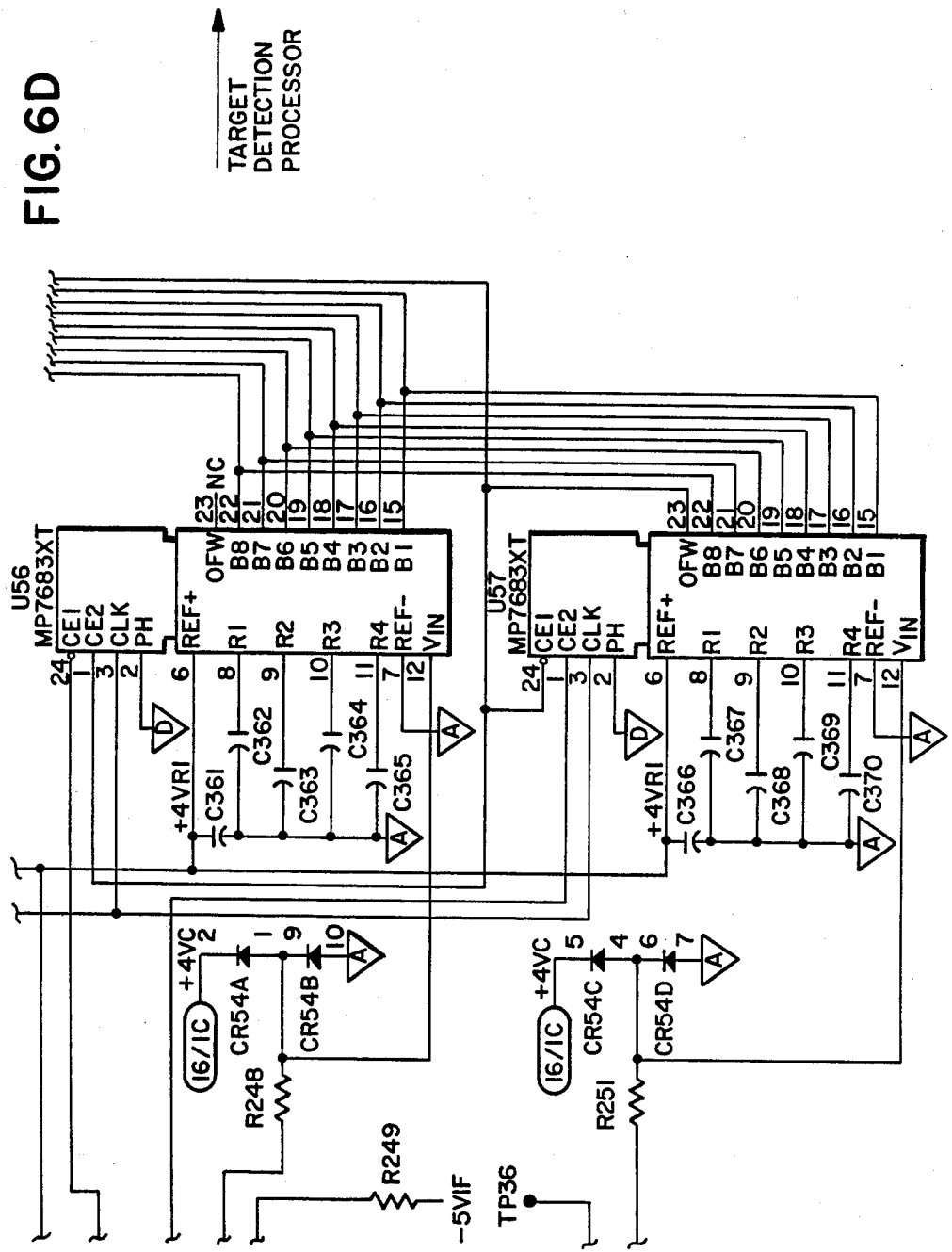

FIG. 6 contains a detailed schematic circuit diagram of the background subtractor stage 20 which is schematically illustrated in brief in FIG. 1.

The Hughes Extremely High Speed Background Filter for Radiation Detectors is capable of responding to dynamically varying, structured background radiation changes at speeds which are from one to two orders of magnitude faster than conventional prior filters. The present invention solves a long standing problem associated with cold optics, long-wave infrared sensors that are carried aloft on an aircraft platform. This innovative background filter will have a major impact on future radiation detection systems and will make possible surveillance and tracking configurations which have ranges and sensitivities that greatly exceed that of any previously deployed system.

Although the present invention has been described in detail with reference to a particular preferred embodiment, persons possessing ordinary skill in the art to which this invention pertains will appreciate that various modifications and enhancements may be made without departing from the spirit and scope of the invention. The process described in detail above may also be accomplished digitally by providing the appropriate analog-to-digital conversion circuit elements between the focal plane array and the background filter circuit 10.

What is claimed is:

1. A method of processing signals including the steps of:
   collecting a plurality of output signals from a plurality of radiation detectors including a sampled viewing group of detectors and a remainder group of detectors by
   sampling a selected group of said output signals from said sampled viewing group of said plurality of radiation detectors, said sampled viewing group including a portion of said plurality of radiation detectors which each view a scene and have outputs which are sampled in a substantially simultaneous manner in order to select a plurality of evaluation groups of detector output signals; and
   filtering each of said evaluation groups of detector output signals by
   passing each of said evaluation groups of detector output signals through a bandpass filter circuit having a continuously and automatically self-determining threshold based upon a plurality of previous inputs to said bandpass filter circuit in order to develop a plurality of filtered groups of evaluation signals, and by
   subtracting said plurality of filtered groups of evaluation signals from said plurality of evaluation groups of detector output signals in order to produce a plurality of groups of processed output signals.

2. A method of filtering dynamically varying, structured background signals from a focal plane array column output including the steps of:
   extracting a plurality of output signals from a focal plane array output column of detectors in which each of said detectors in said column views a scene over a preselected interval of time;
   amplifying said output signals;
   sampling said output signals in a sample and hold means for cyclically storing said output signals;
   correcting said output signals for nonuniformities in detector responsivity in each of said detectors by utilizing a responsivity correcting storage means which is programmed to retain compensation information about each of said detectors and normalize said output signals;
   monitoring said output signals for threshold exceedances;
   suppressing large signal bursts among said output signals using a threshold band comparison and time-out logic circuit;
   filtering a predetermined range of frequencies of dynamically varying, structured background signals from said output signals; and
   subtracting said background signals from said output signals in order to produce processed signals expressive of information about target objects present in said scene.

3. Apparatus for providing an extremely high speed, real-time background filter for a plurality of radiation detectors comprising:

interface means for receiving a plurality of signals from a plurality of radiation detectors and amplifying said plurality of signals to produce an interface means output signal;

recursive extraction and temporary storage means coupled to said interface means output signal for repetitively and periodically eliciting and maintaining a signal level from said interface means and for defining an interval of time related to each one of a plurality of evaluation cycles;

normalization means having an input coupled to said recursive extraction and temporary storage means for generating a plurality of compensated signals by compensating each of said plurality of signals for disparities among said plurality of signals due to systemic variations within said plurality of detectors;

disjunction means coupled to said normalization means for generating a disjunction means output signal expressive of an undesired background radiation signal component of said compensated signals;

threshold window means coupled to said normalization means and to said disjunction means for sensing operative values of said plurality of compensated signals and for disengaging said disjunction means if one of said compensated signals has a value outside of a preselected range of values defining a threshold window;

cyclical reset means coupled to said threshold window means and to said disjunction means for re-engaging and resetting said disjunction means when one of said plurality of compensated signals falls outside of said threshold window and also when said recursive extraction and temporary storage means cycles through a predetermined number of said evaluation cycles; and output signal generation means comprising a signal subtraction means coupled to an output of said normalization means, to an output of said disjunction means, and to said threshold window means, said subtraction means being operable for producing an output signal that does not include said undesired background radiation signal portion of said plurality of compensated signals, said undesired background radiation portion being removed from each of said compensated signals by said signal subtraction means subtracting said disjunction means output signal from each of said compensated signals.

4. Apparatus as claimed in claim 3 in which:
said interface means includes a differential amplifier which receives a plurality of signals from a focal plane array column output.

5. Apparatus as claimed in claim 3 in which:
said recursive extraction and temporary storage means coupled to said interface means for repetitively and periodically eliciting and maintaining a signal level from said interface means and for defining the interval of one evaluation cycle includes a sample and hold device.

6. Apparatus as claimed in claim 3 in which:
said normalization means includes:
a digital to analog converter,
a random access memory circuit coupled to said digital to analog converter, and
an amplifier.

7. Apparatus as claimed in claim 3 in which:
said disjunction means includes a filter which further includes a resistor coupled to a capacitor.

8. Apparatus as claimed in claim 3 in which:
said output signal generation means includes an operational amplifier which subtracts said undesired background radiation signal portion out from said plurality of compensated signals.

9. A cross scan background filter for a radiation detector array comprising:
differential amplifier means operatively coupled to a column of an array of radiation detectors for sequentially differentially amplifying individual ones of a plurality of radiation detector output signals from the column;

sample and hold means operatively coupled to an output of said amplifier means for sampling the amplified detector output signals and for outputting the magnitude of each of the signals so sampled;

detector responsivity normalizing means operatively coupled to an output of said sample and hold means for normalizing the magnitude of each of the signals to a predetermined reference responsivity;

low pass recursive filter means having an input switchably coupled to an output of said normalizing means for sampling and averaging only those normalized signals which have a magnitude within a range of magnitudes expressive of radiation associated with undesired background radiation, said filter means generating an output signal the magnitude of which is expressive of the average value of background radiation detected by said detectors within the column; and background radiation subtraction means having a first input operatively coupled to said normalizing means output and a second input operatively coupled to said filter means output signal for subtracting the filter means output signal from the normalized signal, said subtraction means having an output signal expressive of a desired output signal which is substantially free of background radiation signal.

10. A filter as claimed in claim 9 further comprising spike detection means having an input operatively coupled to said output of said normalizing means and an output operatively coupled to said filter means for uncoupling said filter means input from said normalizing means output when said spike detection means detects that the output of said normalizing means exceeds an upper magnitude associated with said range of magnitudes.

11. A filter as defined in claim 9 wherein said normalizing means comprises a digital data storage means having digital output signals operatively coupled to inputs of a digital to analog converter, said data storage means having data stored within expressive of an amount of signal magnitude required to normalize the output signal of each of said detectors to a predetermined reference detector responsivity signal magnitude.

* * * * *